United States Patent
Esformes (10) Patent No.: US 10,234,181 B2
(45) Date of Patent: Mar. 19, 2019

(54) FLASH GAS BYPASS EVAPORATOR

(71) Applicant: Carrier Corporation, Farmington, CT (US)

(72) Inventor: Jack Leon Esformes, Jamesville, NY (US)

(73) Assignee: CARRIER CORPORATION, Farmington, CT (US)

( * ) Notice: Subject to any disclaimer, the term of this patent is extended or adjusted under 35 U.S.C. 154(b) by 136 days.

(21) Appl. No.: 15/037,386

(22) PCT Filed: Sep. 8, 2014

(86) PCT No.: PCT/US2014/054516
§ 371 (c)(1),
(2) Date: May 18, 2016

(87) PCT Pub. No.: WO2015/073106
PCT Pub. Date: May 21, 2015

(65) Prior Publication Data
US 2016/0298890 A1 Oct. 13, 2016

Related U.S. Application Data

(60) Provisional application No. 61/905,514, filed on Nov. 18, 2013.

(51) Int. Cl.
*F25B 43/00* (2006.01)
*F25B 39/02* (2006.01)
(Continued)

(52) U.S. Cl.
CPC .......... *F25B 43/00* (2013.01); *B01D 19/0057* (2013.01); *F25B 39/00* (2013.01);
(Continued)

(58) Field of Classification Search
CPC .... F25B 2400/23; F25B 39/028; F25B 43/00; F28F 9/0204; F28F 9/026
See application file for complete search history.

(56) References Cited

U.S. PATENT DOCUMENTS 1,662,236 A * 3/1928 Coupland ................. F24D 9/02
165/174
1,794,110 A 2/1931 Gay
(Continued)

FOREIGN PATENT DOCUMENTS

EP 1860390 A2 11/2007
FR 2855254 A1 11/2004
(Continued)

OTHER PUBLICATIONS

PCT International Preliminary Report on Patentability; International Application No. PCT/US2014/054516; International Filing Date: Sep. 8, 2014; dated May 24, 2016; pp. 1-6
(Continued)

*Primary Examiner* — Filip Zec
(74) *Attorney, Agent, or Firm* — Cantor Colburn LLP (57) ABSTRACT

A heat exchanger includes a fluid distribution manifold, a fluid collection manifold, and a plurality of tubes extending there between. A separator within the fluid distribution manifold includes a first fluid conduit and a second fluid conduit. The first fluid conduit extends through an inlet end and over at least a portion of the length of the fluid distribution manifold. A plurality of openings in the first fluid conduit fluidly couples the first fluid conduit to at least a first portion of the plurality of tubes. A first end of a second fluid conduit is arranged generally centrally within and parallel to the first fluid conduit. Refrigerant vapor is configured to flow through the second fluid conduit. Liquid refrigerant is configured to flow between the first fluid (Continued)

conduit and the second fluid conduit to at least the first portion of the plurality of tubes.

20 Claims, 5 Drawing Sheets (51) Int. Cl.
*B01D 19/00* (2006.01)
*F25B 39/00* (2006.01)
*F28D 1/053* (2006.01)
*F28F 9/02* (2006.01)

(52) U.S. Cl.
CPC .......... *F25B 39/02* (2013.01); *F28D 1/05341* (2013.01); *F28F 9/0204* (2013.01); *F28F 9/026* (2013.01); *F25B 39/028* (2013.01); *F25B 2400/02* (2013.01); *F25B 2400/13* (2013.01); *F25B 2400/23* (2013.01)

(56) References Cited

U.S. PATENT DOCUMENTS

| | | | |
|---|---|---|---|
| 4,341,086 A | 7/1982 | Ishii | |
| 4,524,823 A * | 6/1985 | Hummel | F25B 39/028 165/174 |
| 4,972,678 A | 11/1990 | Finlayson | |
| 5,007,247 A | 4/1991 | Danig | |
| 5,056,329 A | 10/1991 | Wilkinson | |
| 5,245,836 A | 9/1993 | Lorentzen | |
| 5,448,899 A | 9/1995 | Ohara | |
| 5,619,861 A | 4/1997 | Yamanaka et al. | |
| 5,782,293 A * | 7/1998 | Sather | F28B 1/06 165/110 |
| 5,806,586 A * | 9/1998 | Osthues | F28F 9/0273 165/153 |
| 5,996,360 A | 12/1999 | Tanaka et al. | |
| 6,250,099 B1 | 6/2001 | Furuya et al. | |
| 6,457,325 B1 | 10/2002 | Vetter | |
| 6,729,386 B1 * | 5/2004 | Sather | F28D 1/05316 165/110 |
| 2006/0102331 A1 | 5/2006 | Taras et al. | |
| 2007/0256821 A1 * | 11/2007 | Mashiko | F28F 9/02 165/160 |
| 2008/0000263 A1 * | 1/2008 | Oomura | F25B 39/028 62/525 |
| 2010/0089559 A1 * | 4/2010 | Gorbounov | F25B 39/028 165/174 |
| 2011/0017438 A1 * | 1/2011 | Huazhao | F25B 39/028 165/174 |
| 2011/0203780 A1 * | 8/2011 | Jiang | F28D 1/05366 165/173 |
| 2012/0180518 A1 * | 7/2012 | Yukimoto | F25B 43/00 62/512 |
| 2013/0160981 A1 * | 6/2013 | Wang | F28F 9/0212 165/178 |

FOREIGN PATENT DOCUMENTS

| | | |
|---|---|---|
| JP | S5735266 A | 2/1982 |
| JP | H0579725 A | 3/1993 |
| WO | 2004055454 A1 | 7/2004 |
| WO | 2008019689 A2 | 2/2008 |

OTHER PUBLICATIONS

International Search Report for application PCT/US2013/054516, dated Nov. 21, 2014, 9 pages.

* cited by examiner

PRIOR ART

FLASH GAS BYPASS EVAPORATOR

CROSS-REFERENCE TO RELATED APPLICATION

This application claims the benefit of U.S. provisional patent application Ser. No. 61/905,514 filed Nov. 18, 2013, the entire contents of which are incorporated herein by reference.

BACKGROUND

This disclosure relates generally to heat exchangers and, more particularly, to providing a bypass for a flash gas in a parallel flow heat exchanger of a refrigeration system.

Figure 1:
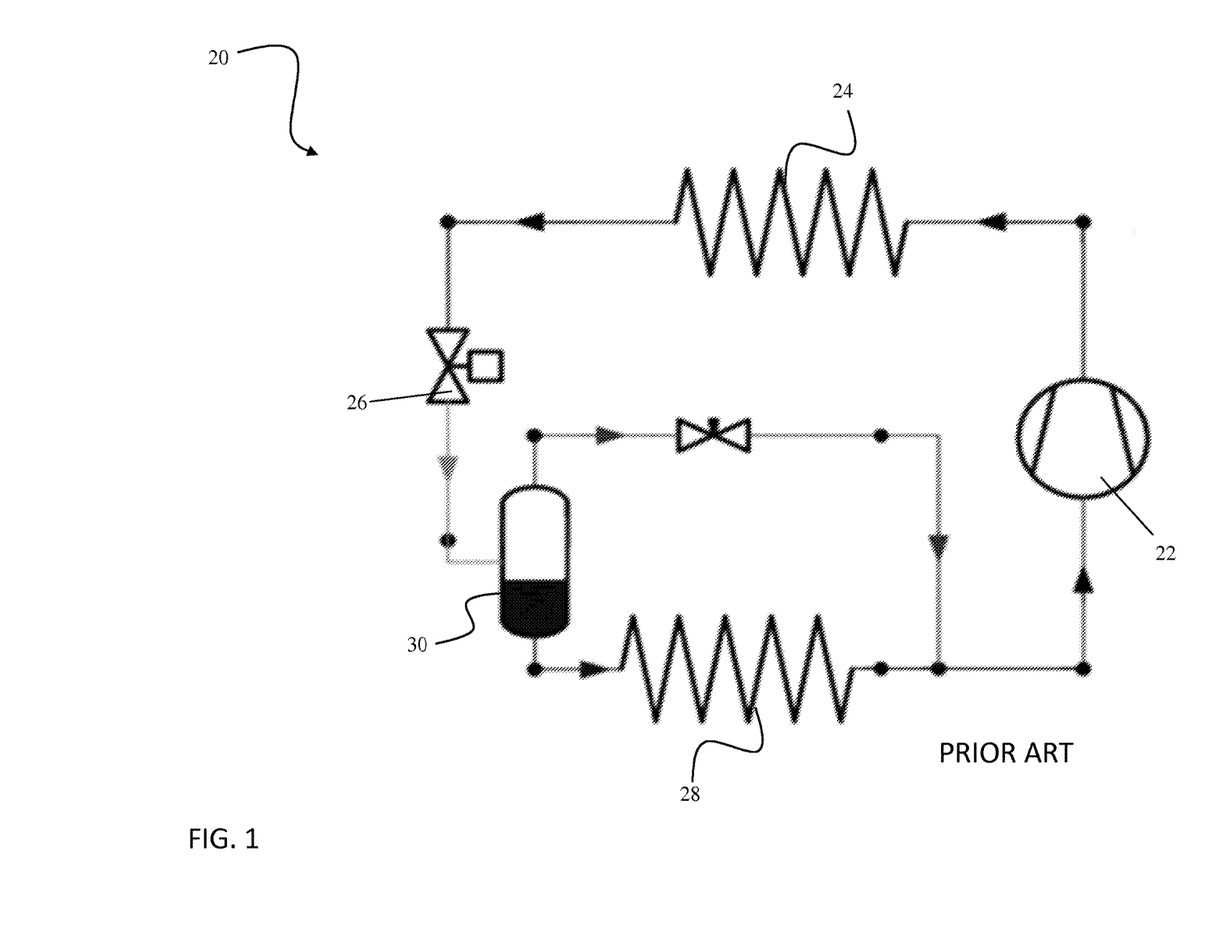
FIG. 1 is an example of a conventional vapor compression system including a separator.

Refrigerant vapor compression systems are well known in the art and are commonly used for conditioning air to be supplied to a climate controlled comfort zone within a residence, office building, hospital, school, restaurant, or other facility. A conventional refrigerant vapor compression system 20, as illustrated in FIG. 1, typically includes a compressor 22, a condenser 24, an expansion device 26, and an evaporator 28 interconnected by refrigerant lines to form a closed refrigerant circuit. As refrigerant flows through the expansion device 26, the pressure of the refrigerant decreases such that 10-20% of the refrigerant vaporizes. If the flash gas or vaporized refrigerant circulates through the evaporator 28 with the liquid refrigerant, the pressure drop in the evaporator 28 increases, thereby decreasing the performance of the vapor compression system 20. In addition, the flow of flash gas through the evaporator 28 results in maldistribution of the refrigerant among the multiple conduits in the evaporator 28, leading to less than optimal utilization of the heat transfer surface thereof.

To maximize the efficiency of the refrigerant vapor compression system 20, an external separator 30 is fluidly connected to the closed loop refrigeration circuit downstream from the expansion valve 26 and upstream from the evaporator 28. The separator 30 divides the 2-phase refrigerant mixture from the expansion device 26 into liquid refrigerant and vaporized refrigerant. The liquid refrigerant is provided to the evaporator 28, and the flash gas is provided directly to an inlet of the compressor 22. Bypassing the flash gas around the evaporator 28 can result in capacity and coefficient of performance (COP) improvements of about 20%. The additional components and controls associated with integrating an external separator 30 into the vapor compression system 20, however, increase both the cost and complexity of the system 20, essentially nullifying any benefits achieved and making application of an external separator 30 impractical.

SUMMARY OF THE INVENTION

According to a first embodiment of the invention, a heat exchanger includes a fluid distribution manifold, a fluid collection manifold, and a plurality of tubes extending there between. A separator within the fluid distribution manifold includes a first fluid conduit and a second fluid conduit. The first fluid conduit extends through an inlet end and over at least a portion of the length of the fluid distribution manifold. A plurality of openings in the first fluid conduit fluidly couples the first fluid conduit to at least a first portion of the plurality of tubes. A first end of a second fluid conduit is arranged generally centrally within and parallel to the first fluid conduit. Refrigerant vapor is configured to flow through the second fluid conduit. Liquid refrigerant is configured to flow between the first fluid conduit and the second fluid conduit to at least the first portion of the plurality of tubes.

According to another embodiment of the invention, a method of separating a two phase refrigerant mixture is provided including supplying the two phase refrigerant mixture to a separator arranged in a fluid distribution manifold of a heat exchanger. The two phase refrigerant mixture is separated within a first fluid conduit of the separator. The liquid refrigerant of the two phase refrigerant mixture is adjacent an interior wall of the first fluid conduit and a refrigerant vapor of the two phase refrigerant mixture is at a center of the first fluid conduit. The refrigerant vapor flows to a second fluid conduit arranged at least partially within generally parallel to the first fluid conduit. The liquid refrigerant between the first fluid conduit and the second fluid conduit is diverted to at least a first portion of heat exchanger tubes.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 2:
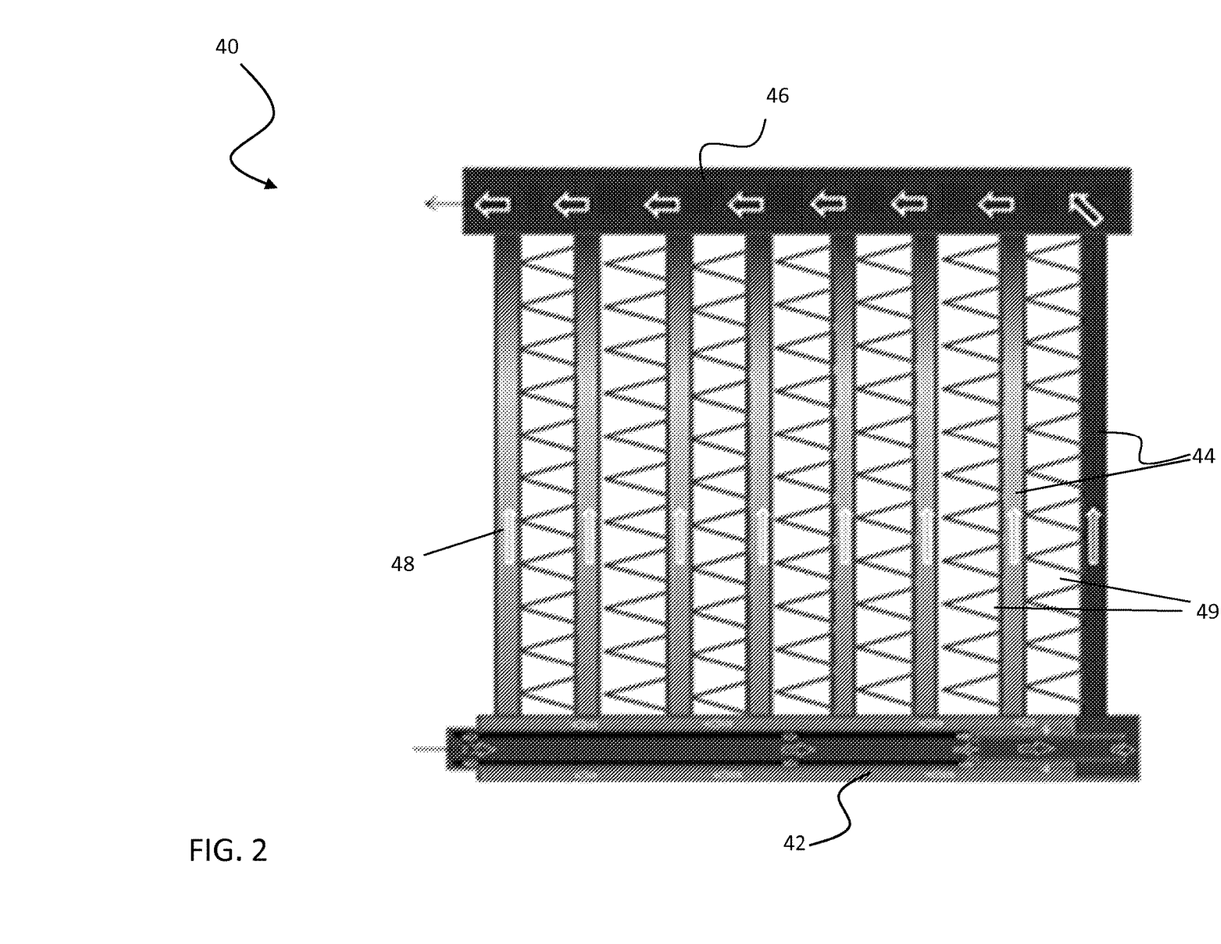
FIG. 2 is a side elevation view, partly sectioned, of an embodiment of a parallel flow heat exchanger according to an embodiment of the invention.

Referring now to FIG. 2, a parallel flow heat exchanger 40 includes a fluid distribution manifold 42 and a plurality of parallel disposed and longitudinally spaced tubes 44 extending between the fluid distribution manifold 42 and a fluid collection manifold 46. The tubes 44 define parallel heat exchanger flow passes 48 opening into the respective interior chambers of the fluid distribution manifold 42 and the fluid collection manifold 46 for conveying fluid from the fluid distribution manifold 42 to the fluid collection manifold 46. A plurality of fins 49, mounted to the exterior of the plurality of tubes 44, serve as a secondary heat transfer surface configured to transfer heat from the air to the refrigerant flowing through the tubes 44. The tubes 44 of the heat exchanger 40 are depicted as flattened multichannel tubes wherein each of the parallel flow passes 48 is subdivided into a plurality of "microchannel" or "minichannels" flow passages. Microchannel and minichannel tubes differ only by channel size, i.e. the hydraulic diameter of the channel. The term multichannel heat exchanger refers to both minichannel and microchannel heat exchangers.

The invention disclosed herein will be further described with the reference to the heat exchanger 40 in application as an evaporator heat exchanger in a direct expansion refrigeration system (not shown) wherein refrigerant flowing through the refrigeration system passes in heat exchange relationship with a heating fluid, for example air to be cooled, and is evaporated as the refrigerant traverses the heat exchanger 40. Prior to entering the fluid distribution manifold 42, the refrigerant traverses an expansion device, for example a thermostatic expansion valve, an electronic expansion valve, a capillary tube, or other expansion device. As the refrigerant passes through the expansion device 26, the refrigerant is expanded from a higher pressure liquid to a lower pressure two-phase mixture of refrigerant liquid and refrigerant vapor.

Figure 3:
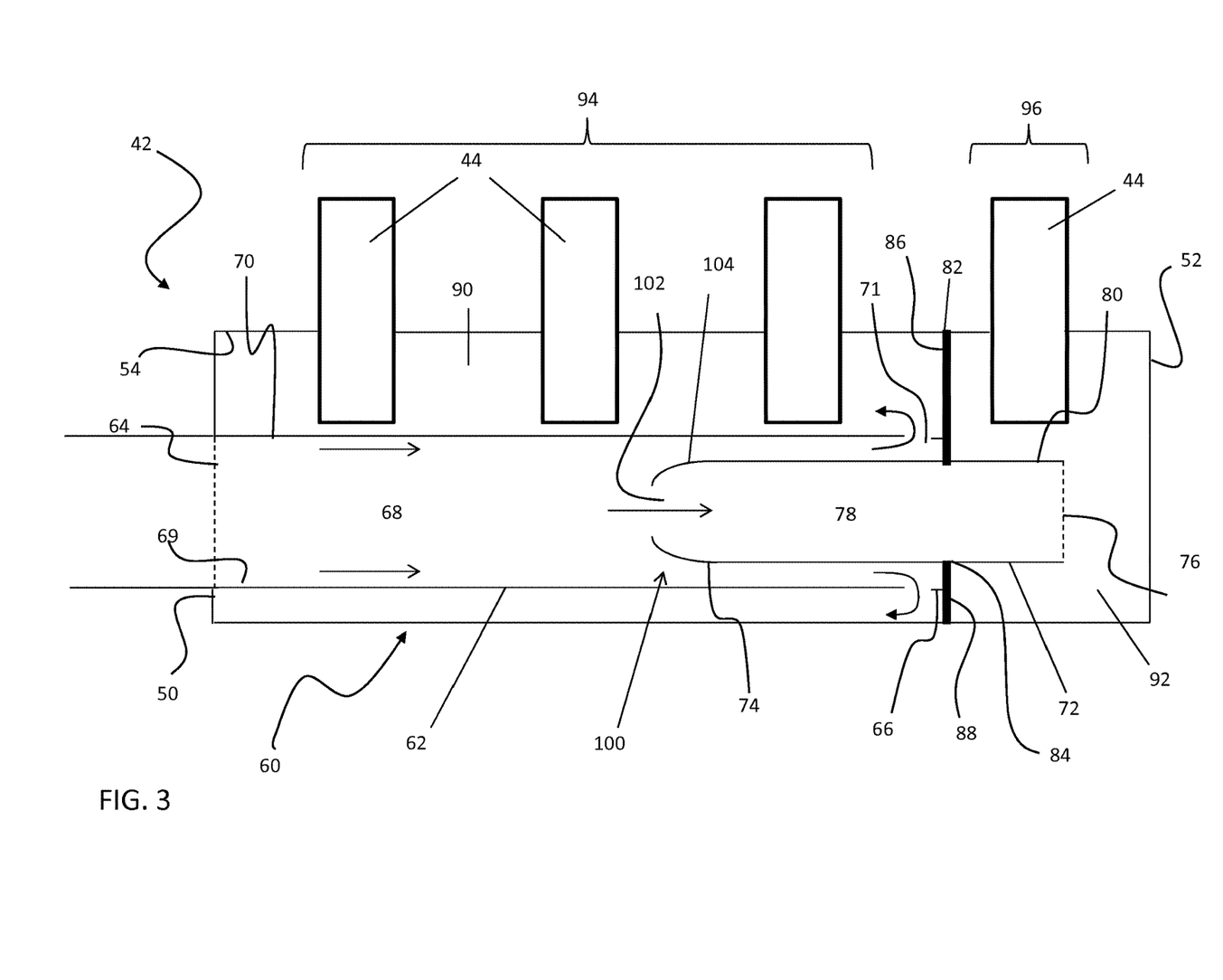
FIG. 3 is a cross-sectional view of a separator formed within a fluid distribution manifold of a heat exchanger according to an embodiment of the invention.
Figure 4:
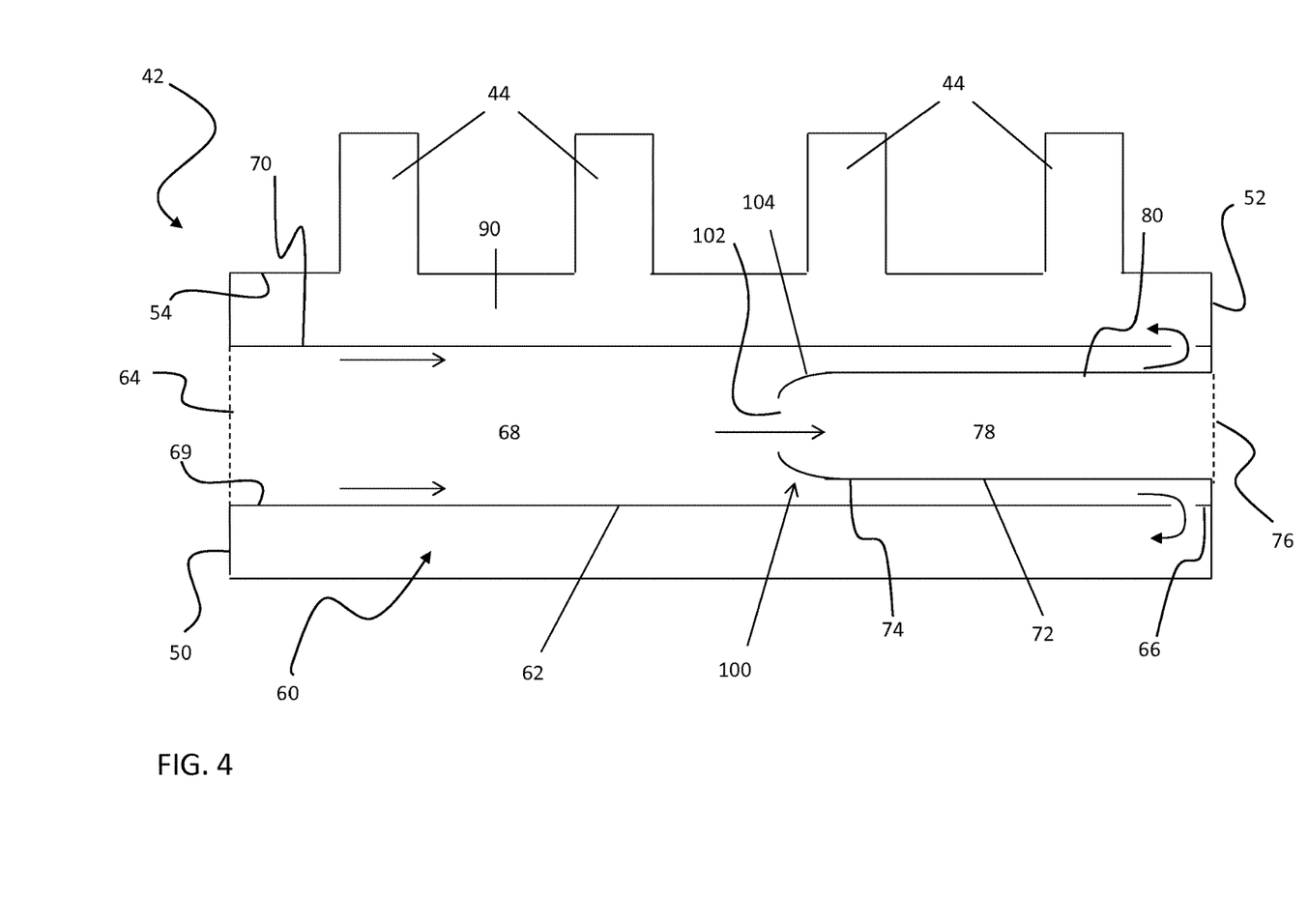
FIG. 4 is a cross-sectional view of a separator formed within a fluid distribution manifold of a heat exchanger according to another embodiment of the invention.

Referring now to FIGS. 3 and 4, a separator 60 configured to divide the two-phase mixture from the expansion device into liquid refrigerant and refrigerant vapor is formed within the fluid distribution manifold 42 of the heat exchanger 40. The separator 60 includes a first fluid conduit 62 and a second fluid conduit 72, the outer diameter of the second fluid conduit 72 being smaller than the inner diameter of the first fluid conduit 62. The first fluid conduit 62 extends through an inlet end 50 over at least a portion of the length of the fluid distribution manifold 42. The first conduit 62 may be mounted at an offset position within the manifold 42 as illustrated in FIG. 3, or may be arranged near a center of the manifold 42, as shown in FIG. 4. In one embodiment, illustrated in FIG. 3, the first fluid conduit 62 extends over a majority of the length of the fluid distribution manifold 42. Alternatively, the first fluid conduit 62 may extend from the inlet end 50 to an opposite end 52 of the fluid distribution manifold 42 (FIG. 4). The second fluid conduit 72 is positioned such that a first end 74 of the second fluid conduit 72 is arranged generally centrally within the interior 68 of the first fluid conduit 62. The second fluid conduit 72 is positioned generally concentrically with the first fluid conduit 62 such that the fluid flow through the first fluid conduit 62 and the second fluid conduit 72 are substantially parallel and coaxial. The second end 76 of the second fluid conduit 72 may be spaced away from the end 52 of the fluid distribution manifold 42, as shown in FIG. 3, or alternatively, may be coupled to the end 52 (FIG. 4). In embodiments where the first fluid conduit 62 is connected to the second end 52 of the fluid distribution manifold 42, the second fluid conduit 72 is similarly coupled the second end 52.

In embodiments where the first fluid conduit 62 extends over only a portion of the length of the fluid distribution manifold 42, the second end 76 of the second fluid conduit 72 is spaced apart from the second end 52 of the fluid distribution manifold 42. In such embodiments, as illustrated in FIG. 3, a divider plate 82, having a central hole 84 through which the second fluid conduit 72 extends, is configured to suspend the second fluid conduit 72 within the fluid distribution manifold 42 generally centrally relative to the first fluid conduit 62. The diameter of the divider plate 82 is substantially equal to the inner diameter of the fluid distribution manifold 42. As a result, a first surface 86 of the divider plate 82 defines a first chamber 90 between the exterior 70 of the first fluid conduit 62 and the interior 54 of the fluid distribution manifold 42. Similarly, a second, opposite surface 88 of the divider plate 82 defines a second chamber 92 between the exterior 80 of the second fluid conduit 72 and the interior 54 of the fluid distribution manifold 42. The second end 66 of the first fluid conduit 62 may be connected, such as with brazing or welding for example, to the first surface 86 of the divider plate 82. When a divider plate 82 separates the fluid distribution manifold 42 into a first chamber 90 and a second chamber 92, a first portion 94 of the plurality of tubes 44 are fluidly coupled to the first chamber 90 and a second portion 95 of the plurality of tubes 44 are fluidly coupled to the second chamber 92.

The two phase mixture from the expansion device flows into the first fluid conduit 62. As the two-phase mixture reaches the first end 74 of the second fluid conduit 72, the refrigerant liquid is generally arranged about the circumference of the interior wall 69 of the first fluid conduit 62 and the refrigerant vapor is generally arranged at the center of the first fluid conduit 62. In the illustrated, non-limiting embodiment, this separation of the two-phase mixture occurs as a result of annular flow within the substantially straight first fluid conduit 62. In another embodiment, illustrated in FIG. 3a, a centrifugal force, such as generated by a spiral or helical fluid conduit 67 for example, may be used to separate the flash gas and liquid refrigerant within the first fluid conduit 62.

Figure 3A:
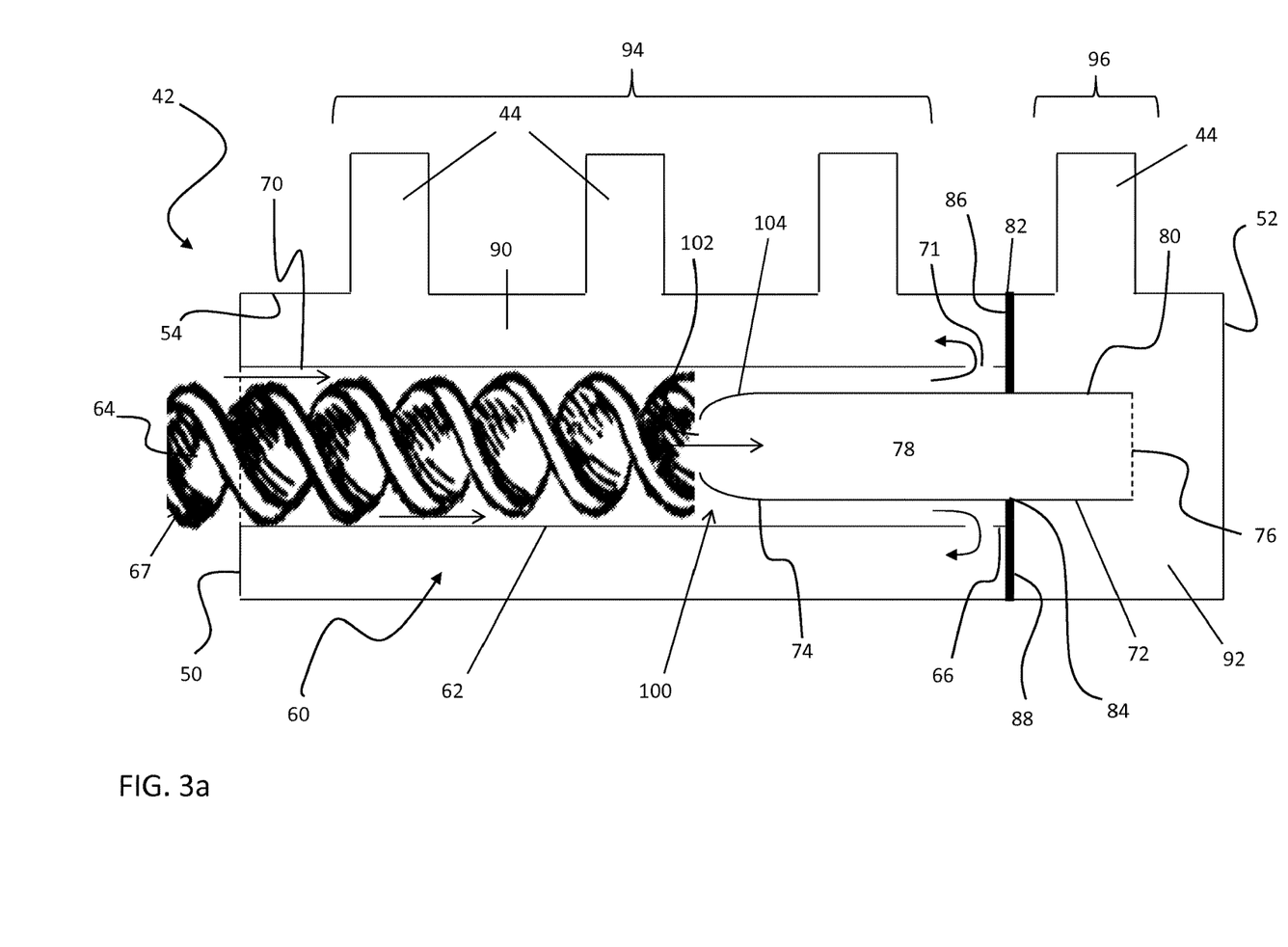
FIG. 3a is a cross-sectional view of a separator formed within a fluid distribution manifold of a heat exchanger according to another embodiment of the invention.

An orifice 100 having a through bore 102 may be connected to the first end 74 of the second fluid conduit 72. The orifice 100 is configured to reduce the amount of liquid refrigerant flowing into the interior 78 of the second fluid conduit 72. In one embodiment, an exterior surface 104 of the orifice 100 is generally sloped to deflect the liquid refrigerant away from the first open end 74 of the second fluid conduit 72 and towards the interior surface 69 of the first fluid conduit 62.

Referring again to FIG. 3, as the vaporized refrigerant flows through the interior 78 of the second fluid conduit 72, the liquid refrigerant flows about the exterior 80 of the second fluid conduit 72. Formed about the circumference of the second end 66 of the first fluid conduit 62 is a plurality of openings 71 configured to provide a flow path for the liquid refrigerant to the first chamber 90. The openings 71 may be substantially similar, or may differ in size and shape. Liquid refrigerant between the interior 69 of the first fluid conduit 62 and the exterior 80 of the second fluid conduit 72 passes through the plurality of openings 71 into the first chamber 90. From the first chamber 90, the liquid refrigerant is distributed to the first portion 94 of the plurality of the tubes 44. The flash gas within the second fluid conduit 72 flows to the second chamber 92 and into the second portion 96 of the plurality of tubes 44 coupled thereto.

With reference to the separator 60 illustrated in FIG. 4, because the second end 66 of the first fluid conduit 62 is coupled to the outlet end 52 of the fluid distribution manifold, the manifold 42 only includes a single chamber 90, and the entire plurality of tubes 44 is configured to receive liquid refrigerant. The liquid refrigerant between the interior 69 of the first fluid conduit 62 and the exterior 80 of the second fluid conduit 72 passes through the plurality of openings 71 into the first chamber 90 and is distributed amongst the plurality of tubes 44. A connection member (not shown), external to the fluid distribution manifold 42, may be fluidly coupled to the second end 78 of the second fluid conduit 72. The refrigerant vapor is configured to flow through the interior 78 of the second fluid conduit 72 to the connection member. The connection member may be configured to provide the vaporized refrigerant to the fluid collection manifold 46 of the heat exchanger 40 or to an inlet of a compressor positioned downstream from the heat exchanger 40.

Integration of a separator 60 into a heat exchanger 40 of a vapor compression system increases the system capacity and coefficient of performance in a cost effective manner. In addition, when the separator is applied to a microchannel heat exchanger, conventional issues associated with distribution of the mixture between the plurality of tubes 44 are solved.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims. In particular, similar principals and ratios may be extended to the rooftops applications and vertical package units.

I claim:

1. A parallel flow heat exchanger comprising:
    a fluid distribution manifold;
    a fluid collection manifold;
    a plurality of parallel disposed and longitudinally spaced tubes extending between the fluid distribution manifold and the fluid collection manifold;
    a separator arranged within the fluid distribution manifold and configured to separate a two phase refrigerant mixture into a liquid refrigerant and a refrigerant vapor, including:
        a first fluid conduit extending through an inlet end of the fluid distribution manifold and over at least a portion of a length of the fluid distribution manifold, wherein a plurality of openings are formed in the first fluid conduit, the plurality of openings being configured to fluidly couple the first fluid conduit to at least a first portion of the plurality of tubes;
        a second fluid conduit, a first end of the second fluid conduit being arranged generally centrally within and parallel to the first fluid conduit such that the refrigerant vapor is configured to flow through the second fluid conduit and the liquid refrigerant is configured to flow between the first fluid conduit and the second fluid conduit to at least the first portion of the plurality of tubes; and
        an orifice arranged at the first end of the second fluid conduit, wherein the orifice is contoured to deflect the liquid refrigerant toward an interior wall of the first fluid conduit.

2. The parallel flow heat exchanger according to claim 1, wherein adjacent the first end of the second fluid conduit, the liquid refrigerant of the two phase refrigerant mixture is positioned at an interior wall of the first fluid tube and the refrigerant vapor of the two phase refrigerant mixture is arranged at a center of the first fluid conduit.

3. The parallel flow heat exchanger according to claim 2, wherein separation of the two phase refrigerant mixture within the first fluid conduit occurs as a result of annular flow.

4. The parallel flow heat exchanger according to claim 2, wherein the two phase refrigerant mixture separates within the first fluid conduit as a result of centrifugal forces.

5. The parallel flow heat exchanger according to claim 1, wherein the orifice has a through bore.

6. The parallel flow heat exchanger according to claim 5, wherein the orifice has a generally sloped exterior surface configured to deflect the liquid refrigerant toward an interior wall of the first fluid conduit.

7. The parallel flow heat exchanger according to claim 1, wherein both the first fluid conduit and the second fluid conduit are coupled to an end of the fluid distribution manifold, opposite the inlet.

8. The parallel flow heat exchanger according to claim 7, wherein the liquid refrigerant is distributed to all of the plurality of tubes.

9. The parallel flow heat exchanger according to claim 7, wherein the second fluid conduit it operably coupled to a connection member, external to the heat exchanger.

10. The parallel flow heat exchanger according to claim 9, wherein the connection member is configured to provide the refrigerant vapor to the fluid collection manifold.

11. The parallel flow heat exchanger according to claim 9, wherein the connection member is configured to provide the refrigerant vapor to a compressor.

12. The parallel flow heat exchanger according to claim 1, wherein the separator further comprises:
    a divider plate configured to support the second fluid conduit, wherein a diameter of the divider plate is substantially identical to an inner diameter of the fluid distribution manifold such that a first surface of the divider plate defines a first fluid chamber within the fluid distribution manifold and a second surface of the divider plate, defines a second fluid chamber within the fluid distribution manifold.

13. The parallel flow heat exchanger according to claim 12, wherein the first fluid conduit is connected to the first surface of the divider plate such that the liquid refrigerant is configured to flow into the first chamber and the second fluid conduit is spaced from an end of the fluid distribution manifold, opposite the inlet, by a distance such that the refrigerant vapor is configured to flow into the second chamber.

14. The parallel flow heat exchanger according to claim 12, wherein a first portion of the plurality of tubes is operably coupled to the first chamber and a second portion of the plurality of tubes is operably coupled to the second chamber.

15. A method of separating a two-phase refrigerant mixture comprising:
    supplying the two phase refrigerant mixture to a separator arranged in a fluid distribution manifold of a heat exchanger;
    separating the two phase refrigerant mixture within a first fluid conduit of the separator such that a liquid refrigerant of the two phase refrigerant mixture is adjacent an interior wall of the first fluid conduit and a refrigerant vapor of the two phase refrigerant mixture is at a center of the first fluid conduit;
    deflecting liquid refrigerant toward an interior wall of the first fluid conduit via an orifice arranged at a first end of a second fluid conduit arranged generally parallel to the first fluid conduit, the first end of the second fluid conduit being disposed within the first fluid conduit;
    flowing the refrigerant vapor into a second fluid conduit arranged generally parallel to the first fluid conduit; and
    diverting the liquid refrigerant between the first fluid conduit and the second fluid conduit to at least a first portion of heat exchanger tubes.

16. The method according to claim 15, wherein the refrigerant vapor in the second fluid conduit is provided to a second portion of heat exchanger tubes.

17. The method according to claim 15, wherein the refrigerant vapor in the second fluid conduit is provided to a fluid collection manifold of the heat exchanger.

18. The method according to claim 15, wherein the refrigerant vapor in the second fluid conduit is provided to a compressor.

19. The method according to claim 15, wherein the two phase refrigerant mixture separates within the first fluid conduit as a result of annular flow.

20. The method according to claim 15, wherein the two phase refrigerant mixture separates within the first fluid conduit as a result of centrifugal forces.

* * * * *